(12) United States Patent
Wada

(10) Patent No.: US 6,583,909 B1
(45) Date of Patent: Jun. 24, 2003

(54) OPTICAL COMMUNICATION SYSTEM AND OPTICAL SIGNAL CONTROL METHOD THEREFOR

(75) Inventor: Tetsuo Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/228,983

(22) Filed: Jan. 12, 1999

(30) Foreign Application Priority Data

Jun. 30, 1998 (JP) .......................................... 10-185062

(51) Int. Cl.[7] .................... H04B 10/02; H04B 10/16; H04B 10/12
(52) U.S. Cl. .................... 359/177; 359/174; 359/179; 359/341.2; 359/337.13; 359/341.41; 359/341.42
(58) Field of Search .................... 359/174, 177, 359/179, 333, 341.42, 341.4, 341.2, 110, 124, 337.13, 337.4, 341.1

(56) References Cited

U.S. PATENT DOCUMENTS

| | | | | |
|---|---|---|---|---|
| 5,274,496 A | * | 12/1993 | Fujiwara et al. | 359/177 |
| 5,278,687 A | * | 1/1994 | Jannson et al. | 359/125 |
| 5,282,074 A | * | 1/1994 | Miyazaki et al. | 359/177 |
| 5,296,957 A | * | 3/1994 | Takahashi et al. | 359/177 |
| 5,442,476 A | * | 8/1995 | Yamazaki et al. | 359/173 |
| 5,510,925 A | * | 4/1996 | Suzuki et al. | 359/177 |
| 5,513,029 A | * | 4/1996 | Roberts | 359/177 |
| 5,526,164 A | * | 6/1996 | Link et al. | 359/187 |
| 5,548,435 A | * | 8/1996 | Tahara et al. | 359/180 |
| 5,917,623 A | * | 6/1999 | Yoshida | 359/124 |
| 6,038,063 A | * | 3/2000 | Tsuda et al. | 359/341 |
| 6,097,525 A | * | 8/2000 | Ono et al. | 359/181 |
| 6,108,123 A | * | 8/2000 | Kinoshita | 359/337 |
| 6,172,782 B1 | * | 1/2001 | Kobayashi | 359/128 |
| 6,307,658 B1 | * | 10/2001 | Chiaroni et al. | 359/140 |

FOREIGN PATENT DOCUMENTS

| | | |
|---|---|---|
| JP | 59-984 | 1/1984 |
| JP | 3-258035 | 11/1991 |
| JP | 4-246930 | 9/1992 |

* cited by examiner

Primary Examiner—Leslie Pascal
Assistant Examiner—M. R. Sedighian
(74) Attorney, Agent, or Firm—Staas & Halsey LLP

(57) ABSTRACT

An optical communication system according to the present invention includes an optical transmission device and a repeater. The repeater has an automatic level controller for performing average level constant control to an optical signal transmitted from the optical transmission device. The optical transmission device has an average level detector for detecting an average level detection signal of the optical signal transmitted to the repeater, and the average level detector transmits the average level detection signal to the repeater. When the automatic level controller of the repeater detects an average level detection signal, the automatic level controller performs average level constant control for the optical signal with reference to the average level detection signal.

24 Claims, 10 Drawing Sheets

FIG. 10
PRIOR ART
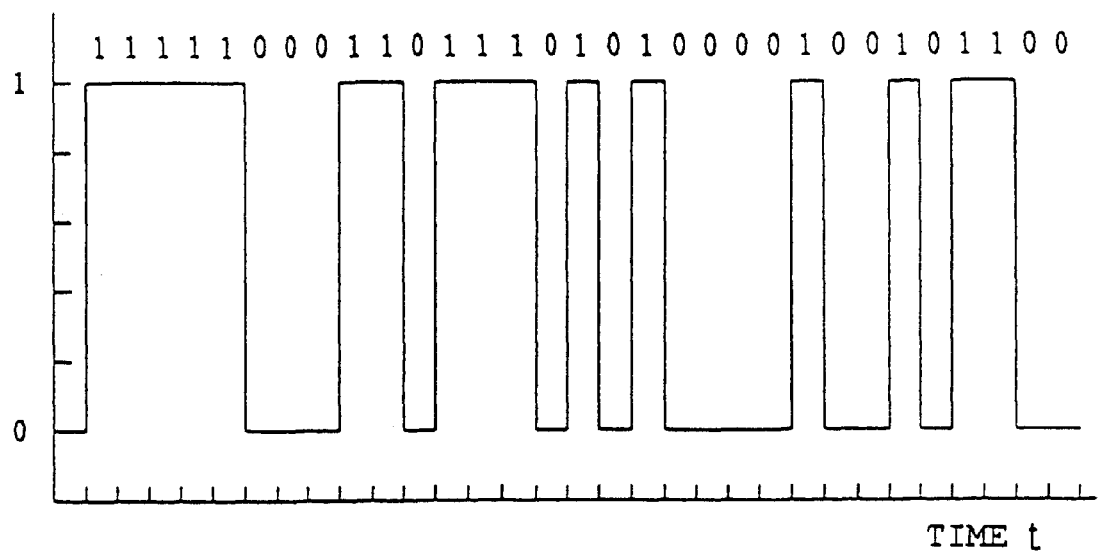
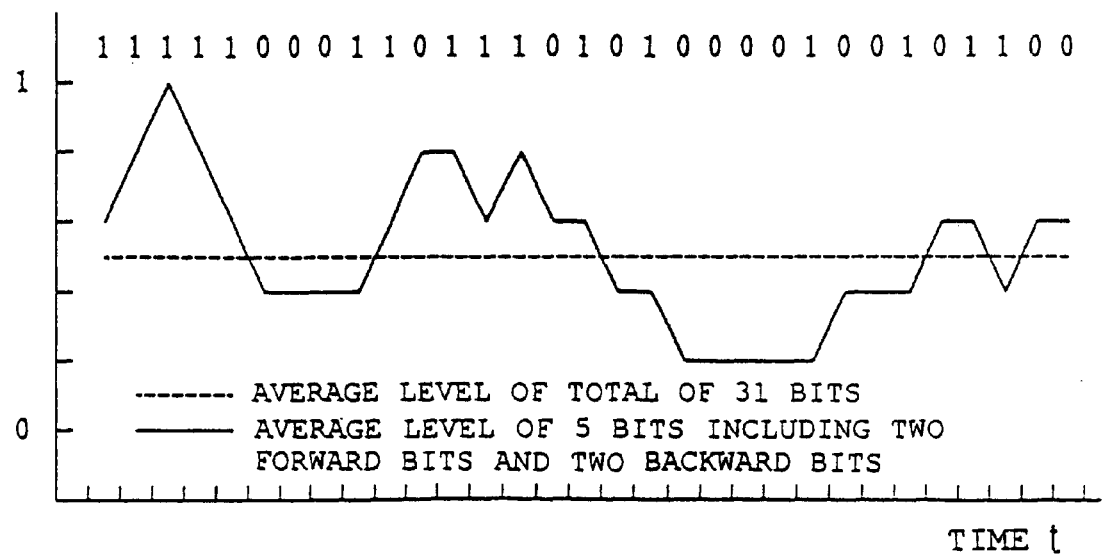

OPTICAL COMMUNICATION SYSTEM AND OPTICAL SIGNAL CONTROL METHOD THEREFOR

BACKGROUND OF THE INVENTION

The present invention relates to an optical communication system for transmitting digital data such as audio data, image data, and text data through an optical transmission path.

FIG. 6 is an entire block diagram showing an example of a conventional optical communication system. Referring to FIG. 6, the optical communication system is constituted by optical terminal station devices 1 and 2 each having the same arrangement and a beam-type repeater 3 connected to the optical terminal station devices 1 and 2 through optical fibers OF1 to OF4, and two optical communication paths for transmitting a main signal (signal transmitted through optical terminal station devices) between the optical terminal station devices 1 and 2 in both the directions.

In an optical transmitter 4 of the optical terminal station device 1, a transmission electric signal serving as a main signal is converted into an optical signal by using an electric/optical converter (E/O) 5, and the optical signal is amplified to a predetermined level by an optical post-amplifier 6. Thereafter, the optical transmitter 4 transmits the main signal to the transmission path (optical fiber OF1). In the repeater 3, the main signal attenuated by loss of the transmission path is amplified by an optical inline amplifier 7 to a predetermined level, and the main signal is transmitted to the transmission path (optical fiber OF2) again. In an optical receiver 8 of the optical terminal station device 2, the main signal attenuated by loss of the transmission path is amplified by an optical pre-amplifier 9, and the main signal is converted into a reception electric signal by an optical/electric converter (O/E) 10 to output the reception electric signal.

As described above, the optical inline amplifier 7 of the repeater 3 does not convert the main signal into an electric signal. For this reason, an arrangement in which an electric signal according to the main signal is detected from the optical inline amplifier 7 and an arrangement in which the optical inline amplifier 7 is supervised and controlled on the basis of the detected electric signal cannot be employed. Therefore, in order to supervise and control the optical inline amplifier 7, an optical signal for supervisory and control (optical supervisory transmission signal (OSC: optical supervised channel)) is used.

In the example shown in FIG. 6, the optical terminal station devices 1 and 2 and the repeater 3 have supervisory transmission signal processing units 11 and 12. The supervisory transmission signal processing unit 11 transmits an OSC having an optical wavelength different from that of the main signal. The OSC includes supervisory/control information of the optical inline amplifier 7. The OSC is optically wavelength-multiplexed with the main signal by an optical system 13, transmitted to the repeater 3, and input to the supervisory transmission signal processing unit 12 through an optical system 14. The supervisory transmission signal processing unit 12 supervises and controls the operation of the optical inline amplifier 7 on the basis of the supervisory/control information included in the OSC. On the other hand, the supervisory transmission signal processing unit 12 outputs an OSC including information of the state, operation, and the like of the optical inline amplifier 7. This OSC is input to the supervisory transmission signal processing unit 11 of the optical terminal station device 1 through optical systems 15a and 16. The supervisory transmission signal processing unit 11 supervises and controls the optical inline amplifier 7 on the basis of information related to the optical inline amplifier 7 included in the OSC. As another method of transmitting the OSC to the repeater 3, a method of superposing the OSC on the main signal to transmit the resultant signal to the repeater 3 in an optical region may be taken.

FIG. 7 is a block diagram of an example of arrangement of the optical inline amplifier 7 shown in FIG. 6. Referring to FIG. 7, the optical inline amplifier 7 is constituted by an optical pre-amplifier (AGC unit) 19, a distribution compensation fiber (DCF) 20, and an optical post-amplifier (ALC unit) 21 which are connected in series with each other. The optical pre-amplifier 19 low-noise-amplifies the main signal by gain constant control (AGC: Auto Gain Control). The DCF 20 compensates for only waveform distortion caused by light distribution in the transmission path. The optical post-amplifier 21 amplifies the main signal amplified by the optical pre-amplifier 19 to a predetermined level by output level constant control (ALC: Auto Level Control).

FIG. 8 is a block diagram of an example of arrangement of the optical post-amplifier 21 shown in FIG. 7. The optical post-amplifier 21 makes an average level of the main signal output from the optical post-amplifier 21 constant by the ALC. The optical post-amplifier 21 is constituted by an optical level controller (optical amplifier) 22, an optical system 23, an O/E 24, a low-pass filter (LPF) 25, and a comparator 26.

The optical level controller 22 amplifies a main signal output from the DCF 20. The optical system 23 partially branches the main signal output from the optical level controller 22 to input the signal to the O/E 24. The O/E 24 optical/electric-converts the optical output signal from the optical system 23. The LPF 25 detects an average level signal of the main signal output from the O/E 24. The comparator 26 compares an average level signal output from the LPF 25 with a reference signal to output the error signal. On the basis of the error signal, the gain of the optical level controller 22 is controlled. The ALC is executed by the above control loop.

The response speed of the ALC is determined by a portion having the lowest response speed in the control loop. This response speed is generally determined by the LPF from the viewpoint of circuit stabilization. In general, a fixed value depending on the level of the main signal output from the optical level controller 22 is set as the reference signal.

To be compared with the ALC, an example of arrangement of the optical pre-amplifier 19 is shown in FIG. 9. As shown in FIG. 9, the optical pre-amplifier 19 controls the gain of an optical level controller 27 by the AGC to be constant. For this reason, the input average level of the main signal is monitored by an optical system 28, an O/E 29, and an LPF 30. The output average level of the main signal is monitored by an optical system 31, an O/E 32, and the LPF 33. The results obtained by the monitoring operations are compared with each other by the comparator 34. The gain of the optical level controller 27 is controlled such that the difference between the levels is constant.

The repeater 3 is arranged to amplify the main signal attenuated by loss of the transmission path to a predetermined level such that the main signal has a waveform being so close to an original waveform as possible. This means that the amplitude of the original main signal is set at the predetermined level, and does not mean that the average level of the main signal is kept constant. Therefore, the ALC is desirably controlled on the basis of the peak detection result of the main signal.

In order to detect the peak of the main signal, a circuit having a speed sufficiently higher than that of the main signal is required. However, the high-speed circuit hinders the superiority of the optical amplifier which has a simple circuit arrangement obtained by amplifying an optical signal and is free from a bit rate. In addition, in a system for optical wavelength division multiplexing (OWDM) transmission in which a plurality of optical signals are multiplexed to amplify the optical signals, peak detection and ALC must be performed in each channel. For this reason, the great advantage of the OWDM in which a plurality of optical signals can be amplified by the optical amplifier at once is lost. For these reasons, average level constant control is generally performed.

The ALC performed by the optical post-amplifier 21 shown in FIG. 8 has the following problem. That is, a main signal transmitted to the repeater 3 is a digital signal transmitted such that logical data of 1/0 corresponds to an ON/OFF state of an optical signal. This main signal is generally subjected to scramble using a pseudo random pattern (PN) to suppress a variation in average level caused by a series of equal signs as hard as possible.

FIG. 10(A) is a graph showing an example of an optical main signal modulated in five stages of a PN (31-bit period). Referring to FIG. 10(A), the ordinate of the graph is standardized with respect to the level of 1/0 of the main signal. FIG. 10(B) is a graph showing an average level corresponding to the main signal shown in FIG. 10(A). A broken line in FIG. 10(B) indicates an average level in a total of 31 bits. A constant value is obtained at $16/31 \approx 1/2$. In contrast to this, a solid line in FIG. 10(B) indicates a variation in average level in a total of five bits including two forward bits and two backward bits. In this manner, although the average level of the main signal is constant within a long period of time, the average level varies within a short period of time. The average level of an optical signal actually detected draws a curve being more moderate than that in FIG. 10(B). The optical signal having five stages of a PN has been described above. However, the average level actually varies in a period longer than that of the optical signal.

Here, observation of the average level for a long period of time corresponds to a low response speed of ALC, and observation of the average level for a short period of time corresponds to a high response speed of ALC. For this reason, when the response speed of ALC is too high, as indicated by a solid line in FIG. 10(B), the peak value of the main signal changes every bit. More specifically, signal degradation depending on the variation pattern of the main signal occurs. As a result, the variable part of the main signal on the reception side is removed as noise, and the reception electric signal is different from an original transmission electric signal, so that an error may be generated.

From a viewpoint for avoiding the above problem, the response speed of ALC is desirably set to be sufficiently low. However, when the response speed of ALC is made sufficiently low, a variation in input level of the main signal may not be suppressed. More specifically, even if the response speed of ALC is sufficiently low, a variation in input level of a main signal having a very low speed (e.g., temperature drift of loss of the transmission path) can be suppressed. In contrast to this, a variation in input level of a main signal having a relatively high speed (e.g., bending loss generated by vibration of a transmission path (optical fiber) may not be suppressed. As described above, the response speed of ALC is basically traded off the variation in input level of the main signal.

SUMMARY OF THE INVENTION

It is an object of the present invention to provide an optical communication system and an optical signal control method therefor capable of suppressing degradation of an optical signal caused by the response speed of ALC in a repeater compared with a prior art.

The present invention employs the following arrangement to achieve the above object. According to the present invention, there is an optical communication system comprising an optical transmission device for converting an electric-signal-type main signal into an optical-signal-type main signal to transmit the optical-signal-type signal, and a repeater for receiving a main signal from the optical transmission device to transfer the main signal to a reception device for a main signal. The repeater has an automatic level controller for performing average level constant control to the main signal received from the optical transmission device and outputting the main signal toward the reception device. The optical transmission device has an average level detector for detecting an average level detection signal, representing an average level of a main signal obtained immediately after the electric signal type is converted into the optical signal type, from the main signal. The average level detector has a detection band width being equivalent to the response speed of the automatic level controller. The automatic level controller performs average level constant control with reference to the average level detection signal detected by the average level detector.

According to the present invention, the automatic level controller of the repeater performs average level constant control to the main signal with reference to the average level detection signal. In this manner, a sharp change in input level of the main signal received by the repeater is suppressed by the automatic level controller. When the response speed of the automatic level controller is set at such a level that signal degradation depending on the variation pattern of the main signal does not occur, in the repeater, the main signal can be suppressed from being degraded by the cause of the response speed of the automatic level controller. Therefore, an optical signal being more appropriate than that of the prior art is transmitted toward the reception device, and an error caused by signal degradation is suppressed from being generated.

BRIEF DESCRIPTION OF THE DRAWINGS

FIGS. 10A and 10B are graphs of an example of an optical signal and an average level corresponding to the optical system.

DETAILED DESCRIPTION OF THE PREFERRED EMBODIMENTS

Embodiments of the present invention will be described below with reference to the accompanying drawings.

Embodiment 1
(Arrangement of Optical Communication System)

Figure 1:
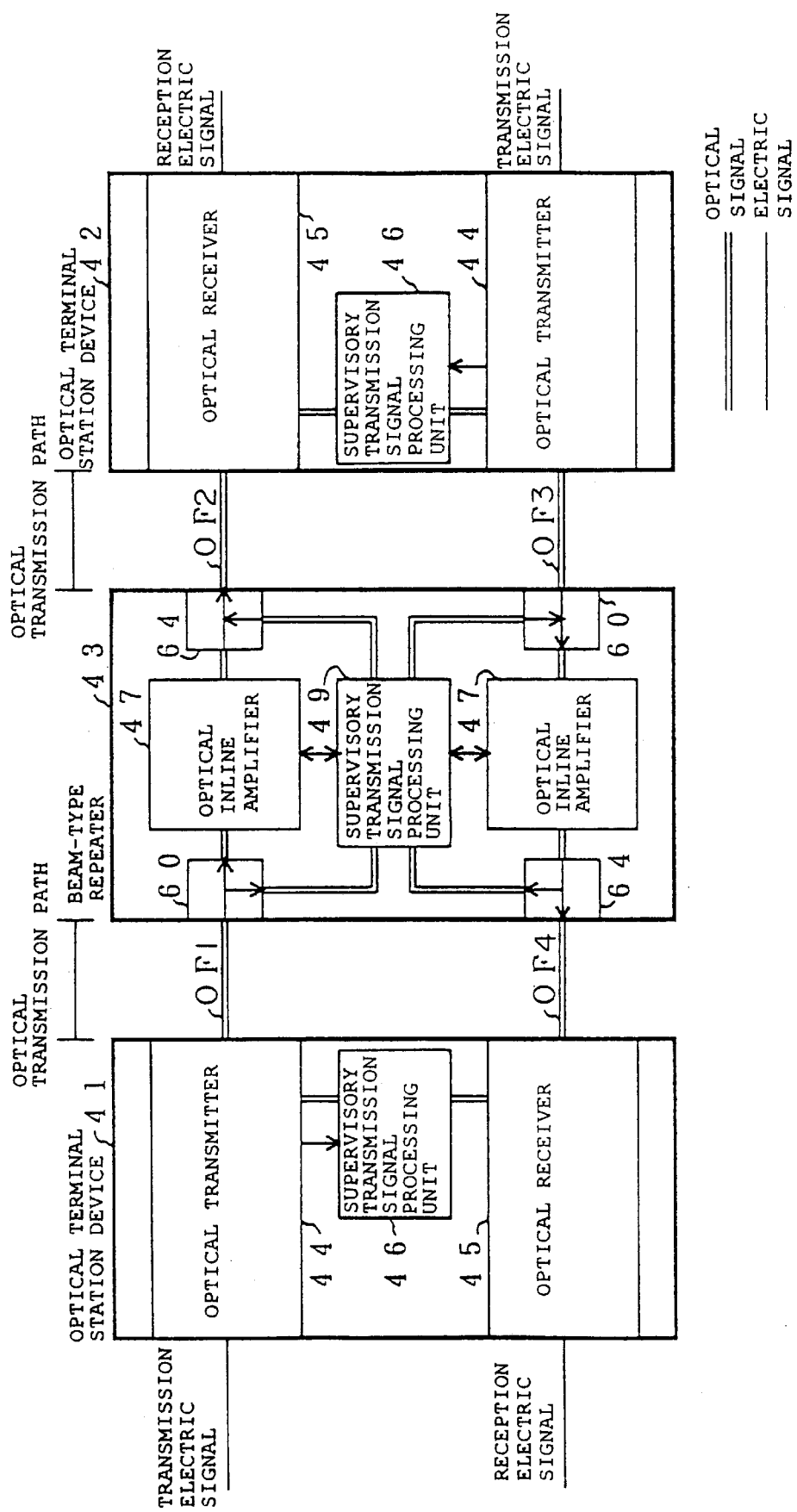
FIG. 1 is an entire block diagram showing an example of an optical communication system according to an embodiment of the present invention.

FIG. 1 is an entire block diagram showing an example of an optical communication system according to Embodiment 1. The optical communication system shown in FIG. 1 is used as an optical transmission path (e.g., a basic trunk of B-ISDN) for transmitting digital data such as audio data, image data and text data. This optical communication system is constituted by optical terminal station devices 41 and 42 arranged on both ends of an optical transmission path and a beam-type repeater 43 connected to the optical terminal station devices 41 and 42 through optical fibers OF1 to OF4.

The optical terminal station devices 41 and 42 have the same arrangement each, and is constituted by an optical transmitter 44, an optical receiver 45, and a supervisory transmission signal processing unit 46. A main signal serving as a transmission signal for digital data such as audio data, image data, and text data is input to the optical transmitter 44 as a transmission electric signal. The optical transmitter 44 converts the main signal into an optical signal to transmit the optical signal toward the repeater 43.

The optical receiver 45 converts the optical-signal-type main signal input from the repeater 43 into an electric signal to transmit the electric signal as a reception electric signal. The supervisory transmission signal processing unit 46 supervises and controls the repeater 43. That is, the supervisory transmission signal processing unit 46 generates an optical signal (OSC) for supervisory and control of the repeater 43 to give the OSC to the optical transmitter 44. On the other hand, the supervisory transmission signal processing unit 46 receives the OSC transmitted from the repeater 43 by the optical receiver 45.

The repeater 43 amplifies the optical signal attenuated by loss of the transmission path to a predetermined level such that the optical signal has a waveform being so close to an original waveform as possible. The repeater 43 is constituted by optical systems 60 and 64, optical inline amplifiers 47, and a supervisory transmission signal processing unit 49. Each optical inline amplifier 47 amplifies an optical signal received from the optical transmitter 44 to transmit the optical signal toward the optical receiver 45. The supervisory transmission signal processing unit 49 supervises and controls the optical inline amplifiers 47 on the basis of the OSCs transmitted from the optical terminal station devices 41 and 42.

Figure 2:
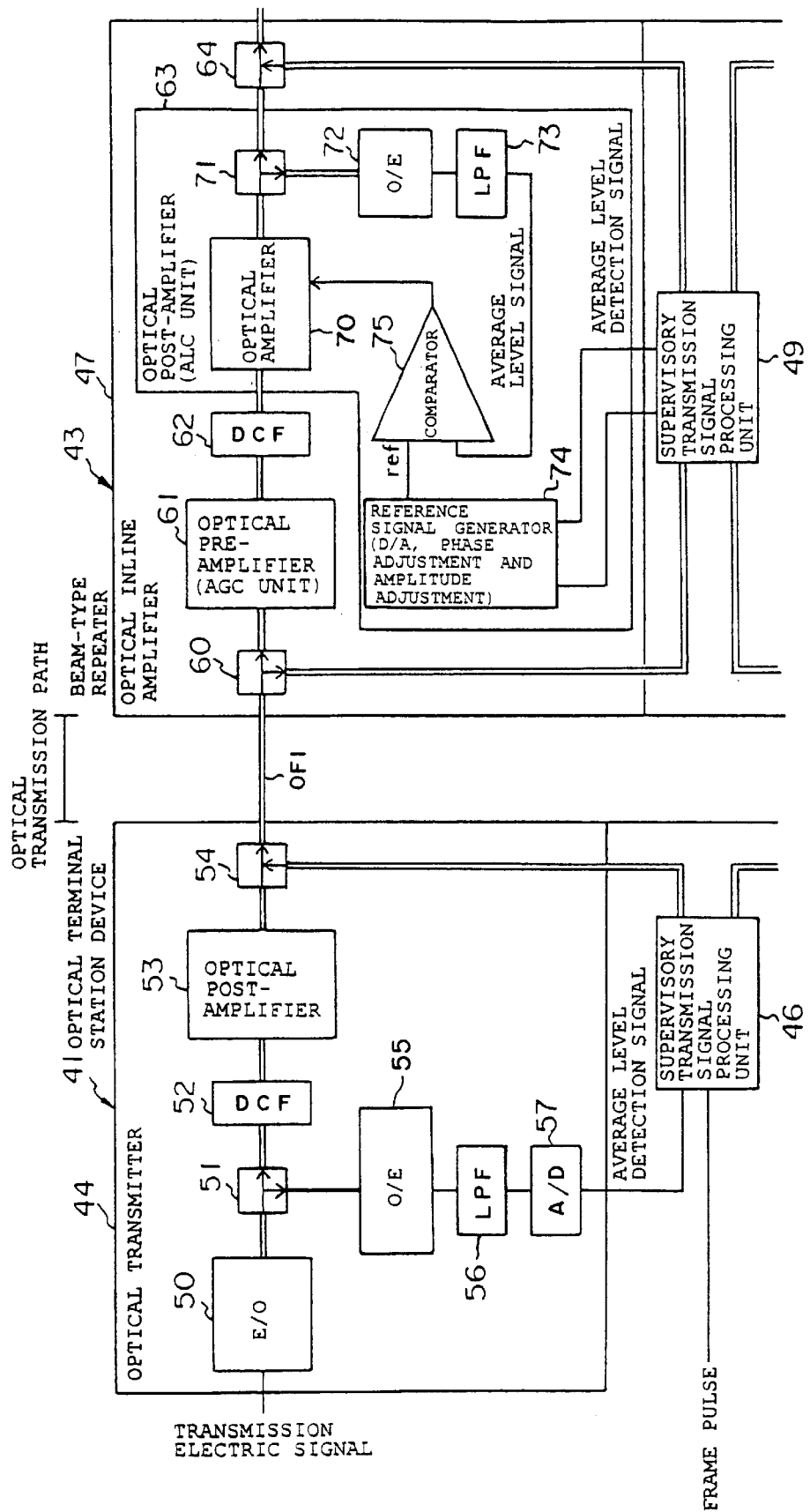
FIG. 2 is a detailed block diagram of an optical transmitter and a repeater which are shown in FIG. 1.
Figure 8:
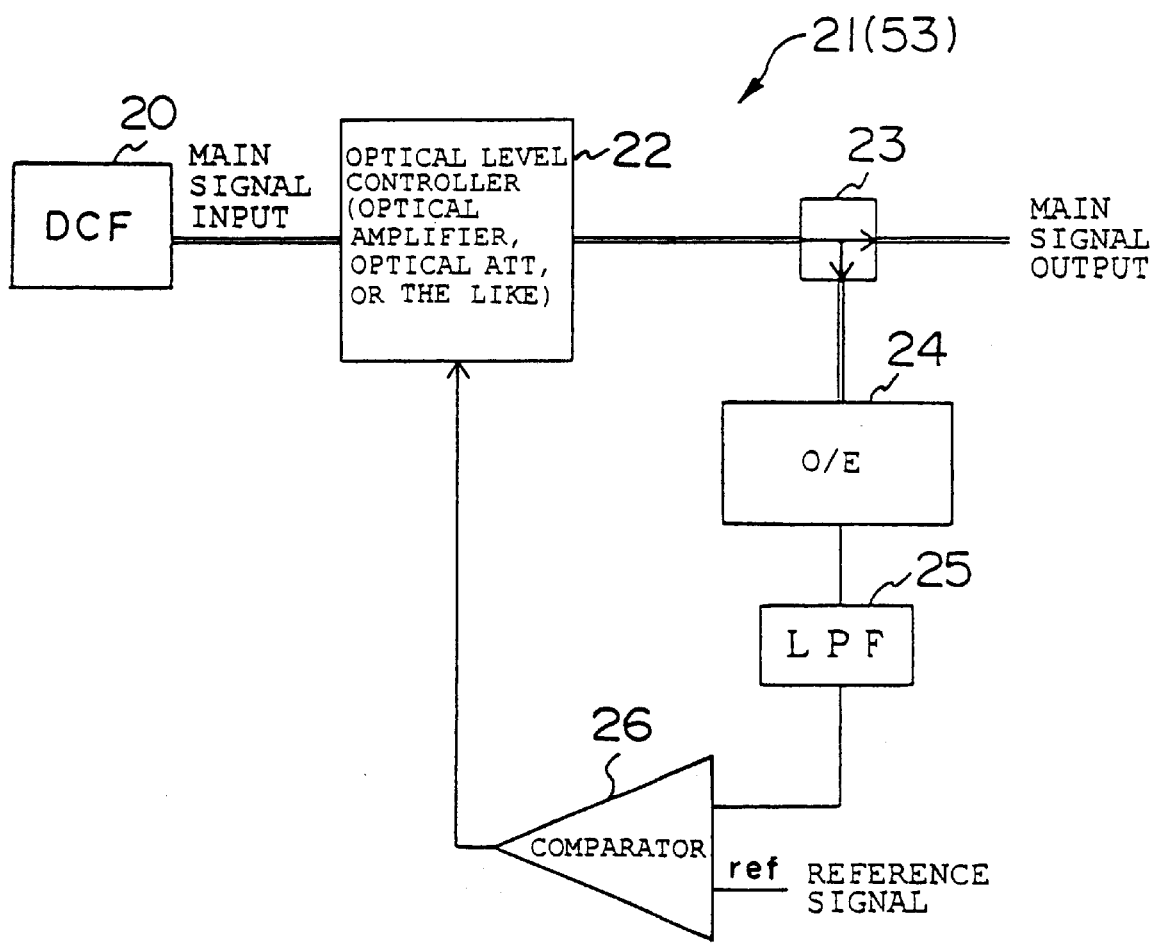
FIG. 8 is a block diagram of an optical post-amplifier (ALC unit) shown in FIG. 7.

FIG. 2 is a detailed block diagram of the optical transmitter 44 and the optical inline amplifiers 47 which are shown in FIG. 1. Referring to FIG. 2, the optical transmitter 44 has an electric/optical converter (E/O) 50 to which a transmission electric signal is input, an optical system 51 arranged on the after stage of the E/O 50, a distribution compensation fiber (DCF) 52 arranged on the after stage of the optical system 51, an optical post-amplifier 53 arranged on the after stage of the DCF 52, and an optical system 54 arranged on the after stage of the optical post-amplifier 53. The optical post-amplifier 53 has the arrangement shown in FIG. 8.

The optical transmitter 44 has an optical/electric converter (O/E) 55, a low-pass filter (LPF) 56 arranged on the after stage of the O/E 55, and an analog/digital converter (A/D) 57 arranged on the after stage of the LPF 56. The output terminal of the A/D 57 is connected to the input terminal of the supervisory transmission signal processing unit 46.

Figure 9:
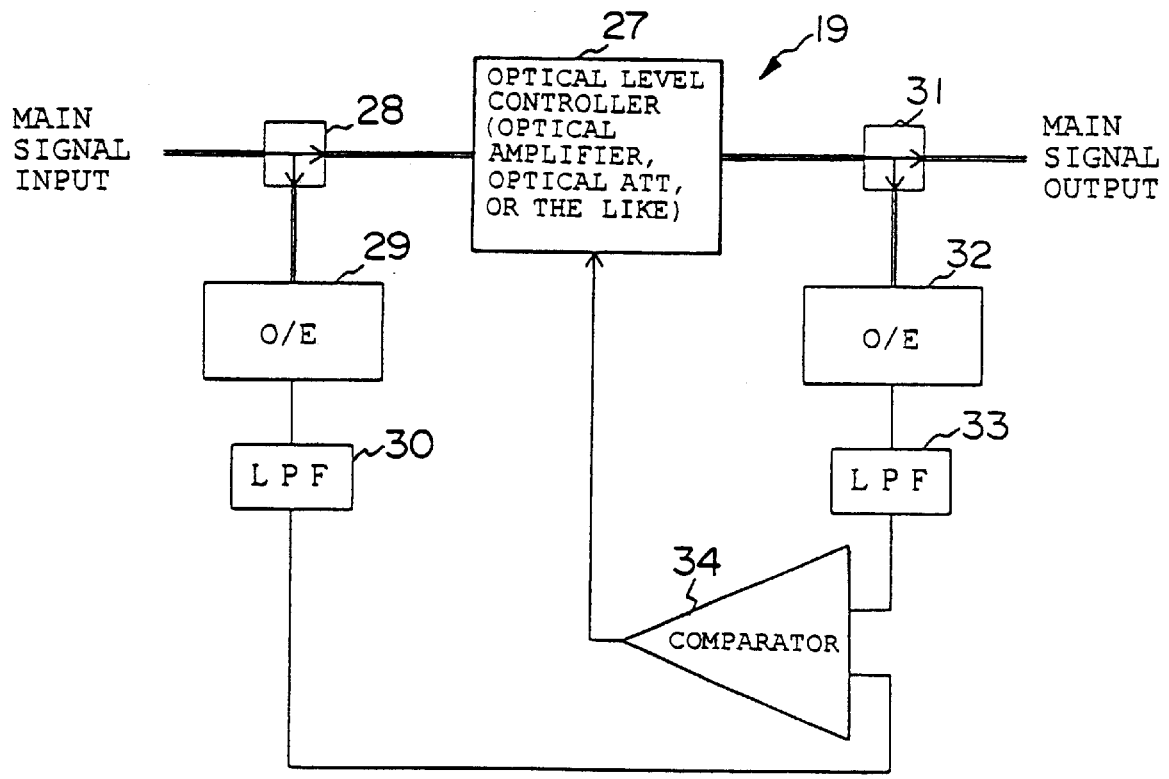
FIG. 9 is a block diagram of an optical pre-amplifier (AGC unit) shown in FIG. 7.

The optical inline amplifiers 47 of the repeater 43 has an optical pre-amplifier (AGC unit) 61 arranged on the after stage of the optical system 60, a DCF 62 arranged on the after stage of the optical pre-amplifier 61, and an optical post-amplifier (ALC unit) 63 arranged on the after stage of the DCF 62. The optical pre-amplifier 61 has the arrangement shown in FIG. 9.

The optical post-amplifier 63, as shown in FIG. 2, has an optical amplifier 70 to which a main signal is input from the DCF 62, an optical system 71 arranged on the after stage of the optical amplifier 70, an O/E 72 to which a part of a main signal output from the optical system 71 is input, and an LPF 73 having an input terminal connected to the output terminal of the O/E 72.

The optical post-amplifier 63 has a reference signal generator 74 having an input terminal connected to the supervisory transmission signal processing unit 49. The optical post-amplifier 63 also has a comparator 75 having two input terminals and an output terminal. One input terminal of the comparator 75 is connected to the output terminal of the LPF 73. The other input terminal of the comparator 75 is connected to the output terminal of the reference signal generator 74. The output terminal of the comparator 75 is connected to the optical amplifier 70.

<Operation of Optical Communication System>

The operation (process performed by the optical terminal station devices 41 and 42 and the repeater 43) of the optical communication system shown in FIGS. 1 and 2 will be described below with reference to FIG. 2. Here, a case wherein a main signal is transmitted from the optical terminal station device 41 to the optical terminal station device 42 will be described below as an example.

Referring to FIG. 2, a transmission electric signal is input to the E/O 50 of the optical transmitter 44 of the optical terminal station device 41 as a main signal. The E/O 50 converts the main signal into an optical signal to transmit the optical signal. The optical system 51 branches the main signal transmitted from the E/O 50 into two directions. In this manner, one of the branched main signals is input to the DCF 52, and the other is input to the O/E 55.

The DCF 52 compensates for waveform distortion caused by distribution of the main signal output from the optical system 51. The main signal whose distortion is removed by the DCF 52 is input to the optical post-amplifier 53. The optical post-amplifier 53 amplifies the main signal input from the DCF 52 to a predetermined level by average level constant control (ALC). The amplified main signal is input to the optical system 54.

On the other hand, the O/E 55 converts the main signal input from the optical system 51 into an electric signal to output the electric signal. The LPF 56 detects a signal ("average level detection signal") representing the average level of the electric signal output from the O/E 55 to output the average level detection signal. In this case, the detection band width of the average level detection signal of the LPF 56 is set to be a value equivalent to the response speed of the ALC performed by the optical post-amplifier 63. According to this embodiment, the response speed of the ALC performed by the optical post-amplifier 63 is determined by the LPF 73. For this reason, the response speed of the LPF 56 is set to be a value equal to the response speed of the LPF 73. The A/D 57 analog/digital-converts the average level detection signal output from the LPF 56 to output the digital signal.

The supervisory transmission signal processing unit 46 receives the average level detection signal output from the A/D 57 and a frame pulse (FP) synchronized with the main signal. The supervisory transmission signal processing unit 46 generates an OSC obtained by adding digital data of another piece of supervisory/control information to the average level detection signal and the frame pulse, and converts the OSC into an optical signal to output the optical signal. The OSC is input to the optical system 54.

The optical system 54 generates a multiplexed signal obtained by optically wave length-multiplexing the main signal and the OSC to output the multiplexed signal toward the repeater 43. The multiplexed signal output from the optical system 54 is transmitted to the repeater 43 through the optical fiber OF1.

The optical system 60 of the repeater 43 separates the multiplexed signal received from the optical terminal station device 41 into the main signal and the OSC. At this time, the separated main signal is input to the optical pre-amplifier 61, and the OSC is input to the supervisory transmission signal processing unit 49.

The optical pre-amplifier 61 low-noise-amplifies the main signal by AGC. The DCF 62 compensates for waveform distortion caused by distribution of the main signal output from the optical pre-amplifier 61 to output the main signal. The optical amplifier 70 amplifies the main signal output from the DCF 62 by ALC to output the main signal. The optical system 71 outputs the main signal output from the optical amplifier 70 toward the optical system 64, and outputs a part of the main signal toward the O/E 72. The O/E 72 converts the main signal output from the optical system 71 into an electric signal to output the electric signal. The LPF 73 detects the average level signal of the main signal output from the O/E 72 to input the average level signal to the comparator 75.

The supervisory transmission signal processing unit 49 converts the OSC transmitted from the optical system 60 into an electric signal and extracts a frame pulse and an average level detection signal to input the frame pulse and the average level detection signal to the optical post-amplifier 63. The supervisory transmission signal processing unit 49 also extracts supervisory/control information from the OSC, and supervises and controls the optical inline amplifiers 47 on the basis of the supervisory/control information. In addition, the supervisory transmission signal processing unit 49 generates an OSC for notifying the optical terminal station device 42 of a supervisory result of the repeater 43 to transmit the OSC toward the optical system 64.

The reference signal generator 74 digital/analog-converts the average level detection signal received from the supervisory transmission signal processing unit 49. Subsequently, the reference signal generator 74 adjusts the phase of the average level detection signal with reference to the frame pulse. More specifically, the reference signal generator 74 causes the optical post-amplifier 63 to reproduce the phase relationship between the average level detection signal and the frame pulse in the supervisory transmission signal processing unit 46. The reference signal generator 74 performs amplitude adjustment to the average level detection signal to input the adjusted average level detection signal to the comparator 75 as a reference signal.

The phase adjustment performed by the reference signal generator 74 is made for the following reasons. That is, the average level detection signal input to the comparator 75 must have a phase which is adjusted to the phase of the main signal to some extent. A change in average level detection signal has a rate which is sufficiently lower than the bit rate of the main signal. For this reason, the precise phase adjustment is not required at the bit level of the main signal. In this embodiment, the average level detection signal is extracted from the main signal, and a process such as an A/D conversion process is performed. Therefore, the average level detection signal is delayed from the main signal in phase. Since this delay cannot be ignored, phase adjustment is performed.

For this reason, the main signal must be delayed between the detection point (E/O 50) of the average level detection signal of the optical transmitter 44 and the optical post-amplifier 63. At this time, when phase matching to the average level detection signal is performed by controlling a delay amount given to the main signal, the circuit probably increases in scale. Fixed delay is desirably given to the main signal to control the phase of the average level detection signal, thereby performing the phase matching between the main signal and the average level detection signal. Therefore, the DCFs 52 and 62 function as delay units for giving fixed delay to the main signal.

Amplitude adjustment of the average level detection signal is performed by the reference signal generator 74 in the following manner. That is, the absolute value of the average level detection signal in an amplitude direction is set at a value which can be uniquely determined with respect to an output level from the optical post-amplifier (ALC unit) 63. The reference signal generator 74 performs amplitude adjustment according to the absolute value.

Thereafter, the main signal transmitted from the optical system 71 and the OSC transmitted from the supervisory transmission signal processing unit 49 are input to the optical system 64 of the repeater 43. The optical system 64 optically wavelength-multiplexes the main signal and the OSC to transmit the multiplexed signal to the optical fiber OF2. In this manner, the multiplexed signal is transmitted to the optical receiver 45 of the optical terminal station device 42 as show in FIG. 1.

Figure 6:
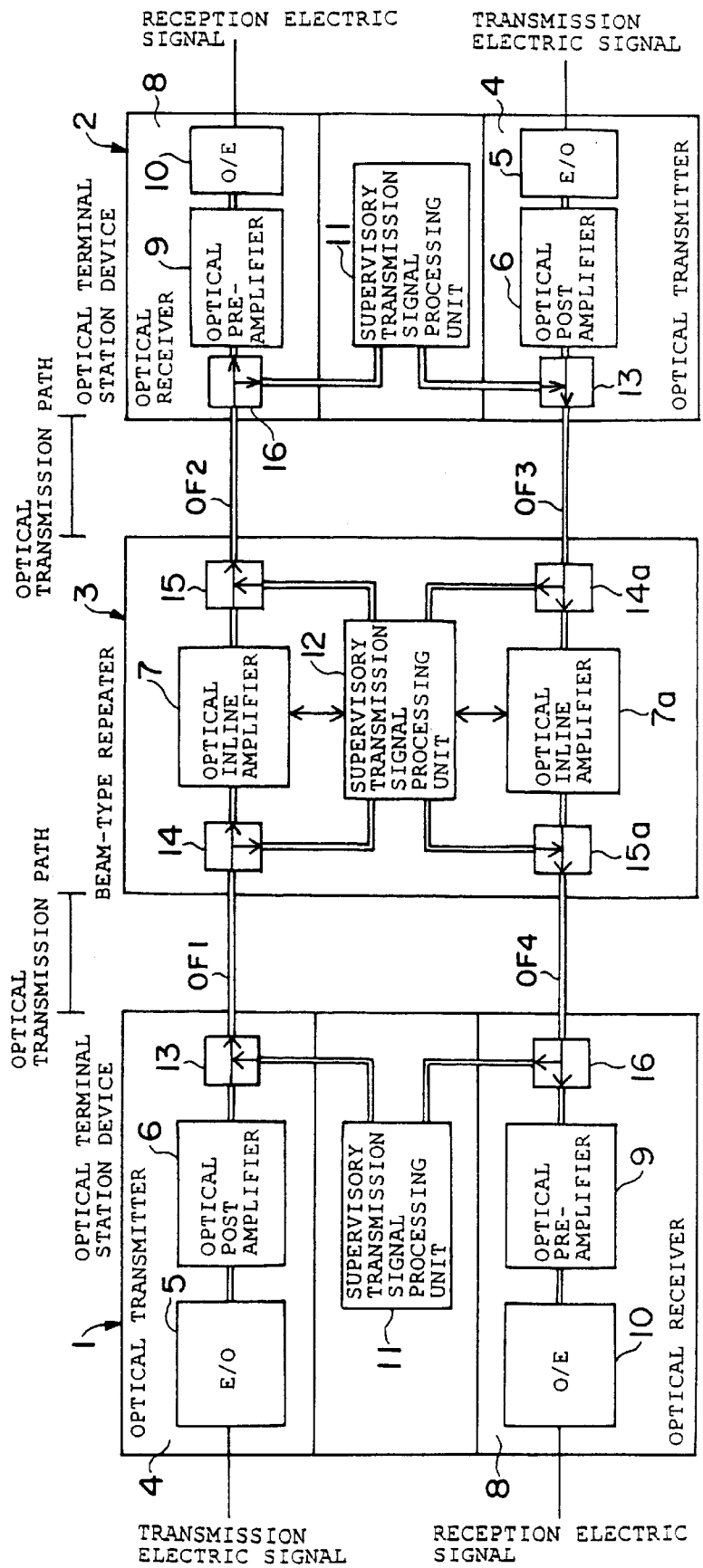
FIG. 6 is an entire block diagram showing an example of a conventional optical communication system.
Figure 7:
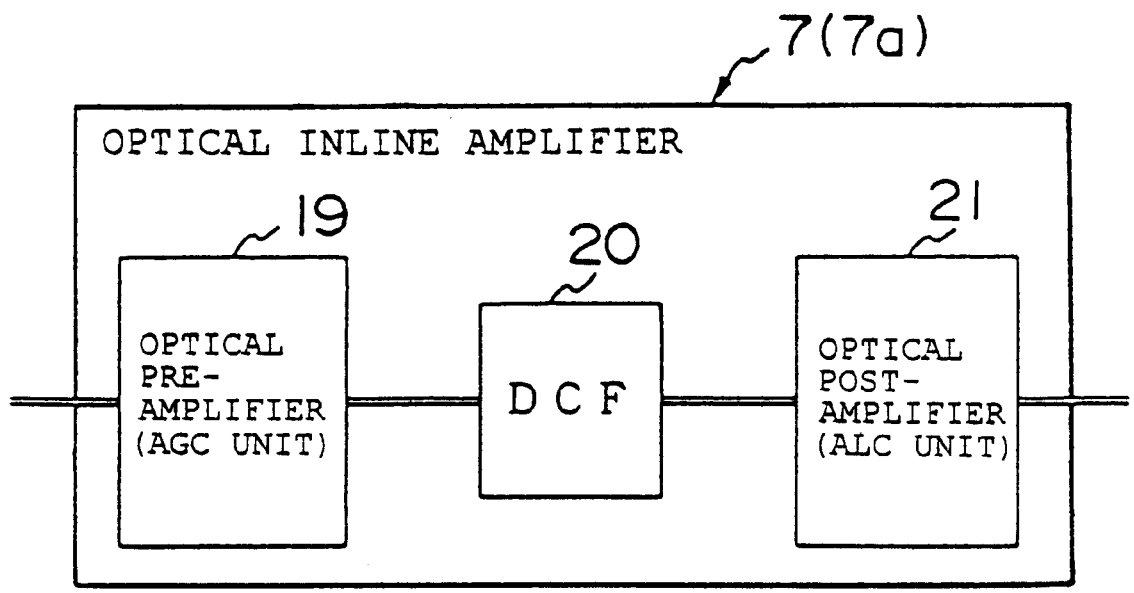
FIG. 7 is a block diagram of an optical inline amplifier shown in FIG. 6.

The optical receiver 45 has an arrangement which is almost the same as that of the optical receiver 8 shown in FIG. 6. The optical receiver 45 separates the multiplexed signal into the main signal and the OSC. The main signal is amplified by AGC, and the main signal is converted into an electric signal to transmit the electric signal as a reception electric signal.

The above operation is also performed when the main signal is transmitted from the optical transmitter 44 of the optical terminal station device 42 to the optical receiver 45 of the optical terminal station device 41.

Function by Embodiment 1

According to the optical communication system of Embodiment 1, as shown in FIG. 2, the optical transmitter 44 has, in addition to a conventional arrangement (optical transmitter 4 shown in FIG. 6), the optical system 51, the O/E 55, and the LPF 56. These elements function as an average level signal detection unit for detecting an average level signal of a main signal in a detection band width being equivalent to the response speed of ALC performed by the optical post-amplifier 63.

The optical post-amplifier 63 of the repeater 43 has the reference signal generator 74. The reference signal generator 74 inputs an average level detection signal as a reference signal to the comparator 75 in place of a conventional fixed value. In this manner, the optical post-amplifier 63 performs ALC (corresponding to an automatic level controller in the present invention) such that an error between the average level of the main signal output from the optical post-amplifier 63 and the average level of the main signal output from the E/O 50 of the optical transmitter 44 is constant.

Therefore, the optical communication system according to Embodiment 1 prevents an disadvantage that the optical post-amplifier 63 cannot suppress a relatively high-speed change in main signal (e.g., bending loss) by sufficiently lowering the response speed of ALC. On the other hand, the optical communication system according to Embodiment 1 can prevent signal degradation depending on the variation pattern of the main signal and caused by an excessively high response speed of ALC.

As described above, according to the optical communication system shown in Embodiment 1, in the repeater 43, the signal degradation of the main signal caused by the response speed of the ALC can be suppressed. Therefore, the appropriate main signal can be transmitted to the optical receiver 45, thereby an error and the like caused by the signal degradation of the main signal can be prevented.

Modification of Embodiment 1

In Embodiment 1, the average level detection signal detected by the optical transmitter 44 is transmitted to the repeater 43 while the average level detection signal is included in the OSC. As the OSC, digital data also including another piece of supervisory/control information is supposed. For this reason, an arrangement in which the average level detection signal is A/D-converted and D/A-converted is employed. This arrangement may be changed into an arrangement in which the average level detection signal is transmitted to the repeater 43 without A/D-converting the average level detection signal. In this case, the A/D 57 and the D/A conversion function of the reference signal generator 74 are not necessary.

In Embodiment 1, the optical system 51 is arranged on the after stage of the E/O 50 to detect the average level detection signal of a main signal immediately after electric/optical conversion. The position where the optical system 51 is arranged may be on the after stage of the DCF 52, for example.

In Embodiment 1, ALC is also performed by the optical post-amplifier 53 of the optical transmitter 44, and a reference signal having a fixed value is input to the comparator 26 (see FIG. 8) of the optical post-amplifier 53. In place of this, an average level detection signal detected by the LPF 56 may be input to the comparator 26 as a reference signal. In this case, the response speed of the LPF 56 must be equal to the response speed of the LPF 25 (see FIG. 8).

A transmission path for a main signal input to the optical post-amplifier 53, as shown in FIG. 2, is arranged inside the housing of the optical terminal station device 41 (42). A variation in input level caused by vibration of the optical transmission path does not easily occur. Therefore, according to Embodiment 1, the response speed of ALC performed by the optical post-amplifier 53 is set to be sufficiently low.

In Embodiment 1, the supervisory transmission signal processing unit 46 transmits a frame pulse synchronized with the main signal to the repeater 43, and the reference signal generator 74 of the repeater 43 adjusts the phase of the average level detection signal by using the frame pulse. Since the frame pulse is used as described above, the arrangement according to Embodiment 1 can be changed into an arrangement in which the phase of a digital average level detection signal is controlled by controlling the position of the average level detection signal after A/D conversion with respect to the frame pulse.

Embodiment 2

Figure 3:
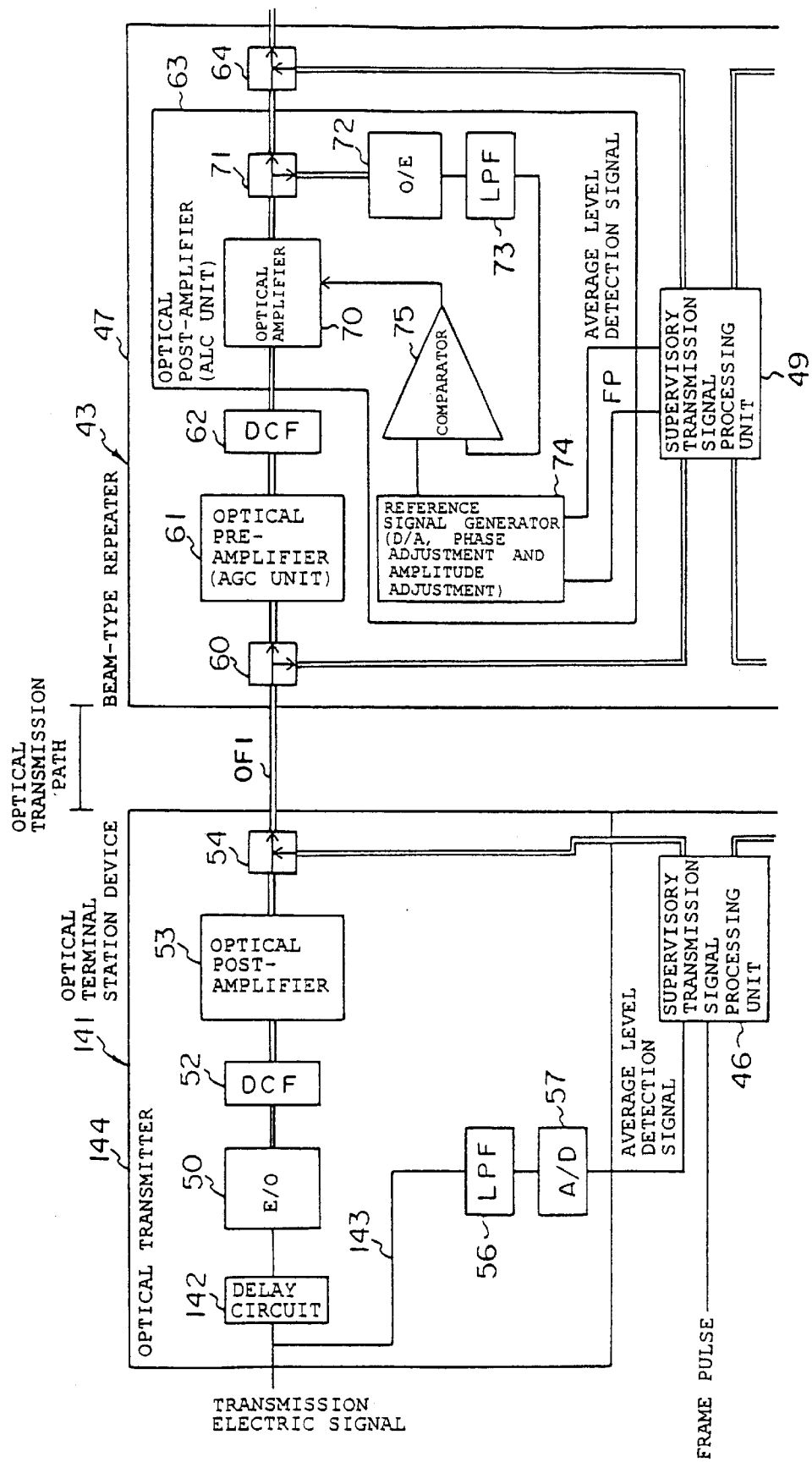
FIG. 3 is a block diagram showing a part of Embodiment 2 of the present invention.

An optical communication system according to Embodiment 2 of the present invention will be described below. Embodiment 2 has the same entire arrangement as that of Embodiment 1 shown in FIG. 1, and the arrangement of an optical transmitter in Embodiment 2 is different from that in Embodiment 1. For this reason, only the different point will be described below. FIG. 3 is a block diagram showing a part of the optical communication system according to Embodiment 2. The same reference numerals as in Embodiment 1 denote the same parts in FIG. 3.

An optical transmitter 144 of an optical terminal station device 141 is different from the optical transmitter 44 (see FIG. 2) according to Embodiment 1 in the following points. That is, the optical system 51 and the O/E 55 are removed. A delay circuit 142 is arranged on the before stage of the E/O 50, and a transmission cable for a transmission electric signal is connected to the delay circuit 142. A signal line 143 is drawn from the before stage of the delay circuit 142 to be connected to the input terminal of the LPF 56.

The operation of the optical transmitter 144 is the same as that in Embodiment 1 except that the LPF 56 detects an average level detection signal from a transmission electric signal and that the delay circuit 142 delays the transmission electric signal.

Embodiment 2 achieves the advantages of Embodiment 1 and the following advantages. That is, according to Embodiment 2, an average level detection signal is detected from a main signal (transmission electric signal) before electric/optical conversion. For this reason, unlike Embodiment 1, the delay circuit 142 can be arranged on the electric stage of the main signal. Therefore, a fixed delay can be given to the main signal easier in Embodiment 2 than in Embodiment 1, and phase adjustment between the main signal and the average level detection signal can be easily performed.

When a sufficient fixed delay can be given to the main signal by only the delay circuit 142, the DCF 52 is not necessary.

Embodiment 3

Figure 4:
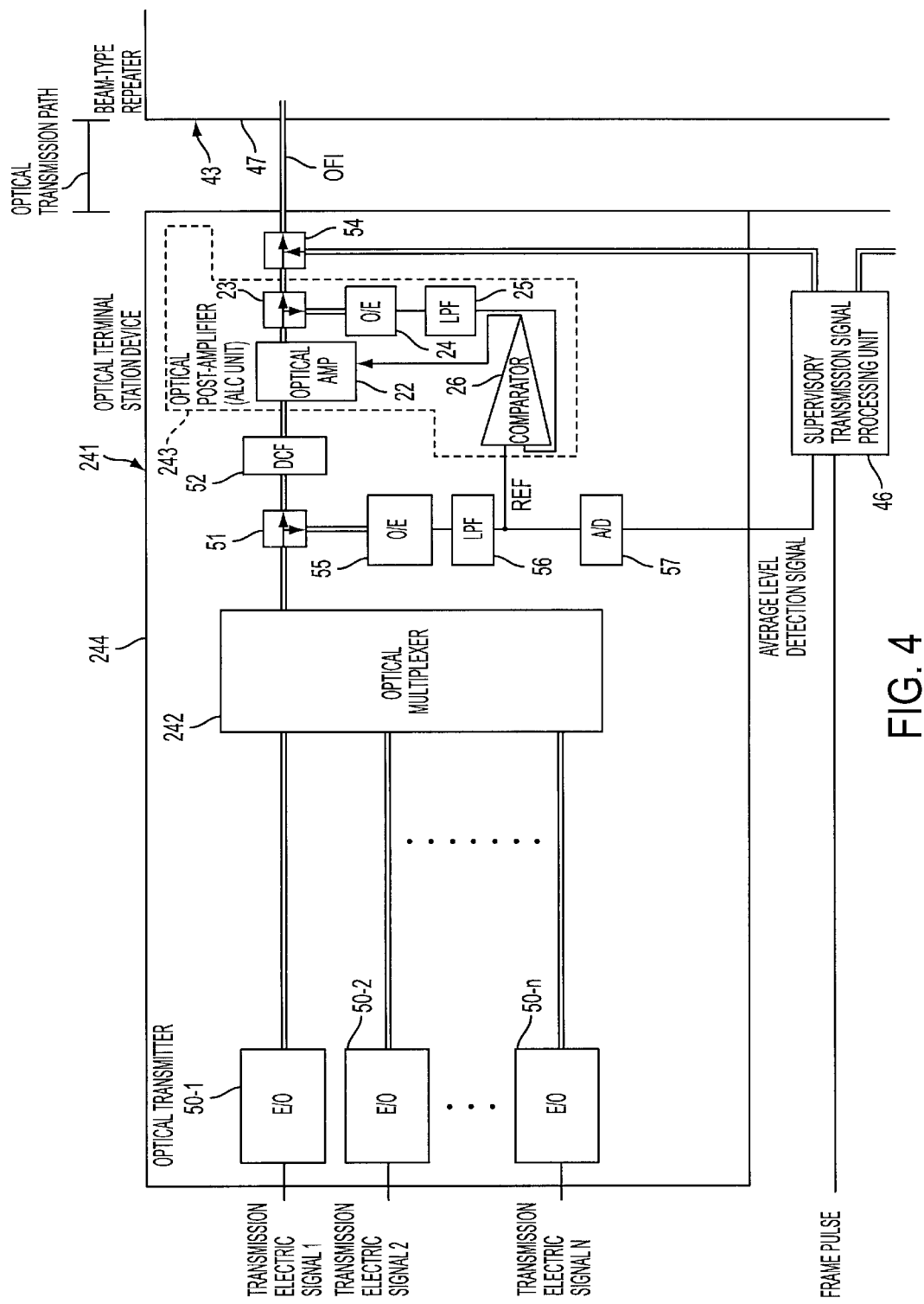
FIG. 4 is a block diagram showing a part of Embodiment 3 of the present invention.

An optical communication system according to Embodiment 3 of the present invention will be described below. Embodiment 3 has the same entire arrangement as that of Embodiment 1 shown in FIG. 1, and the arrangements of an optical transmitter and an optical receiver in Embodiment 3 are different from those in Embodiment 1. For this reason, only the difference point will be described below. FIG. 4 is a block diagram showing a part of the optical communication system according to Embodiment 3. The same reference numerals as in Embodiment 1 denote the same parts in FIG. 4.

An optical transmitter 244 of an optical terminal station device 241 converts a plurality of main signals, i.e., n-wavelength-channel transmission electric signals into optical signals by an optical wavelength division multiplexing (OWDM) transmission system to optically wavelength-multiplex the optical signals, and transmits the optical signals as a multiplexed main signal at once. This optical transmitter 244 is different from the optical transmitter 44 (see FIG. 2) according to Embodiment 1 in the following point. More specifically, a plurality of transmission cables for transmission electric signals are connected to the optical transmitter 244, and a plurality of E/Os 50-1 to 50-n are arranged in correspondence with the transmission cables.

An optical multiplexer 242 is arranged on the after stages of the E/Os 50-1 to 50-n. An optical post-amplifier 243 is different from the optical post-amplifier 53 (see FIG. 8) in that an average level detection signal detected by an LPF 56 is input to a comparator 26 in place of the reference signal of the fixed value.

Since the repeater 43 can amplifies multiplexed main signals received from the optical transmitter 244 at once, the same repeater as that in each of Embodiments 1 and 2 is used.

Although not shown, the optical receiver is constituted by an optical system for separating an optical signal received from the repeater 43 into a multiplexed main signal and an OSC, an optical pre-amplifier for amplifying the multiplexed main signal separated by the optical system by AGC, an optical separation unit for separating the multiplexed main signal amplified by the optical pre-amplifier into optical signals of n channels, and a plurality of O/Es for converting the main signals separated by the optical separation unit into electric signals to transmit the electric signals as reception electric signals.

According to Embodiment 3, transmission electric signals serving as main signals are input to the E/Os 50-1 to 50-n of the optical transmitter 244. At this time, the E/Os 50-1 to 50-n convert the transmission electric signals into optical signals to transmit them. The main signals transmitted from the E/Os 50-1 to 50-n are optically wavelength-multiplexed by the optical multiplexer 242 and transmitted as a multiplexed main signal.

The multiplexed main signal is input to the optical post-amplifier (ALC unit) 243 through the optical system 51 and the DCF 52. The optical post-amplifier 243 amplifies the multiplexed main signal such that an error between the output average level of the multiplexed main signal and an average level detection signal detected by the LPF 56 to transmit the amplified signal. Thereafter, the multiplexed main signal is optically wavelength-multiplexed with an OSC including the average level detection signal and the frame pulse in the optical system 54 to transmit the multiplexed signal to the repeater 43. In the repeater 43, the operation (process) explained in Embodiment 1 is performed.

Embodiment 3 achieves the advantages of Embodiment 1 and the following advantages. That is, according to Embodiment 3, as a reference signal of ALC performed by the optical post-amplifier 243, an average level detection signal detected by the LPF 56 is used. For this reason, even if a variation in input level of the multiplexed main signal input to the optical post-amplifier 243 is caused by an increase/decrease of the number of wavelength channels connected to the optical transmitter 244, a reference signal (average level detection signal) depending on the variation can be input to the comparator 26. For this reason, the optical post-amplifier 243 can be prevented from being erroneously operated by an increase/decrease of the number of wavelength channels.

Embodiment 4

Figure 5:
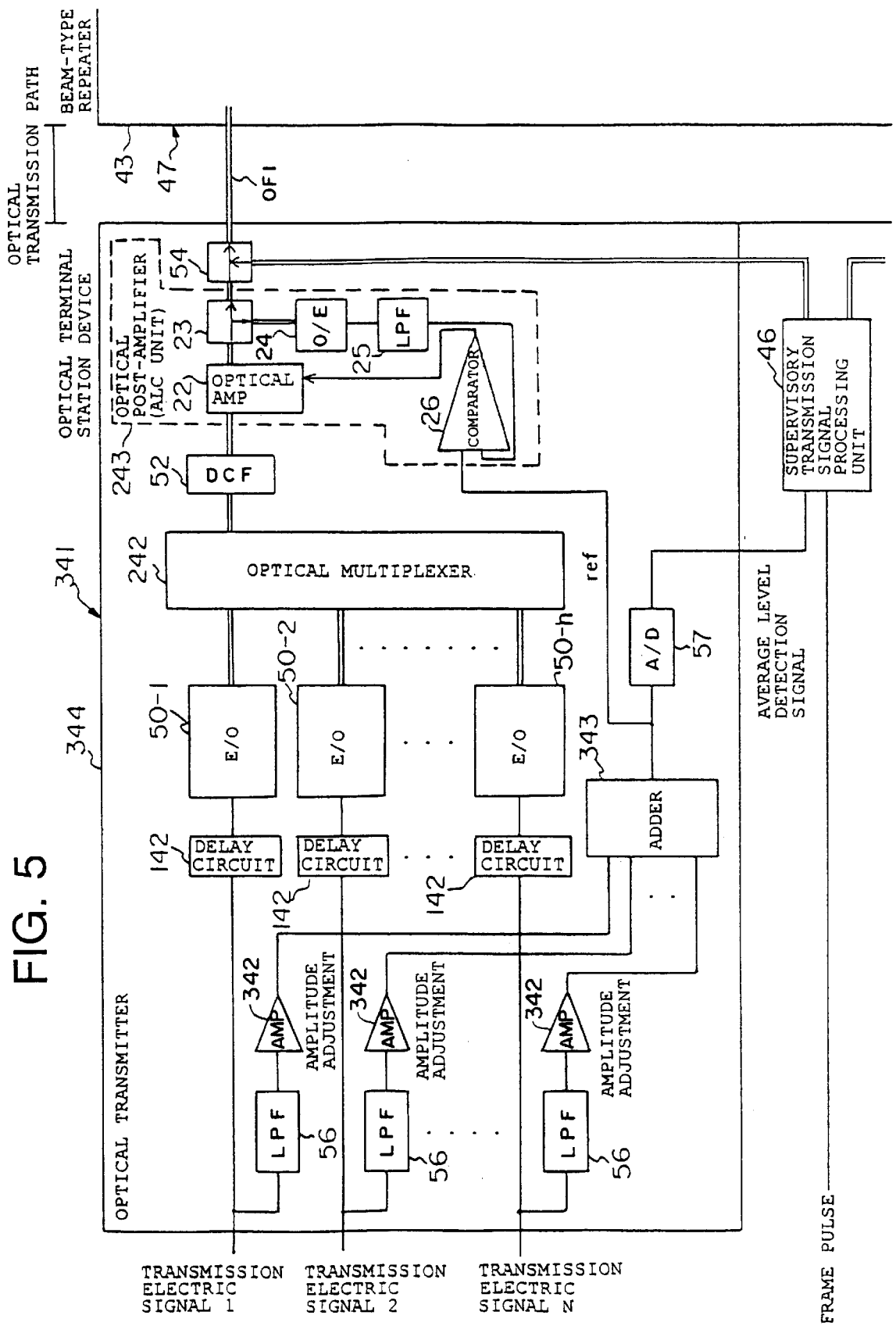
FIG. 5 is a block diagram showing a part of Embodiment 4 of the present invention.

An optical communication system according to Embodiment 4 of the present invention will be described below. In Embodiment 4, as in Embodiment 3, an optical communication system using an optical wavelength division multiplexing (OWDM) transmission system is employed. An optical transmitter equivalently forms an average level detection signal serving as a reference signal from a transmission electric signal. FIG. 5 is a block diagram showing a part of the optical communication system according to Embodiment 4. Referring to FIG. 5, Embodiment 4 is different from Embodiment 3 in only the arrangement of the optical transmitter. For this reason, the same reference numerals as in Embodiment 4 denote the same parts in Embodiment 3, and a description thereof will be omitted.

An optical transmitter 344 of an optical terminal station device 341 is different from the optical transmitter 244 (see FIG. 4) according to Embodiment 3 in the following points. That is, delay circuits 142 are arranged on the before stages of E/Os 50-1 to 50-n, and transmission cables for transmission electric signals of wavelength channels are connected to the delay circuit 42. Signal lines are drawn from the respective transmission cables, and the input terminals of LPFs 56 are connected to the signal lines, respectively. The input terminals of an amplifier 342 are connected to the output terminals of the LPFs 56, respectively. The input terminals of an adder 343 are connected to the output terminals of the amplifier 342. The output terminal of the adder 343 is connected to the input terminal of an A/D 57 and the other input terminal of a comparator 26.

The optical transmitter 344 described above is arranged for the following reason. That is, levels of wavelength channels in OWDM are not always equal to each other. This is because signals having different bit rates may exist in the wavelength channels. For this reason, in order to obtain the same optical SNR (S/N ratio) in the receiver, an optical output level must be changed depending on the bit rate of each main signal. Therefore, the amplifier 342 for adjusting the amplitude of the average level signal is arranged.

According to Embodiment 4, in addition to the advantages of Embodiment 1, the following advantages can be achieved. That is, as in Embodiment 3, a reference signal of ALC depending on an increase/decrease of the number of wavelength channels can be changed. As in Embodiment 2, since a fixed delay can be given to the main signal which is an electric signal, the delay time of the main signal can be adjusted easier in Embodiment 4 than in Embodiment 3.

What is claimed is:

1. An optical communication system comprising:
   an optical transmission device to convert an electric-signal type main signal into an optical-signal-type main signal; and
   a repeater to receive a main signal from the optical transmission device to transfer the main signal toward a reception device for a main signal,
   wherein the repeater has an automatic level controller to perform average level constant control on the main signal received from the optical transmission device and then output the main signal toward the reception device,
   the optical transmission device comprising an average level detector, having a detection band width equivalent to a response speed of the automatic level controller, to detect an average level detection signal, representing an average level of a main signal obtained immediately after the electrical signal type is converted into the optical signal type, from the main signal,
   the automatic level controller performs the average level constant control with reference to the average level detection signal detected by the average level detector.

2. An optical communication system comprising:
   an optical transmission device to convert an electric-signal-type main signal into an optical-signal-type main signal; and a repeater to receive a main signal from the optical transmission device to transfer the main signal toward a reception device for a main signal, wherein the repeater has an automatic level controller to perform average level constant control on the main signal received from the optical transmission device and then output the main signal toward the reception device, the optical transmission device comprising an average level detector, having a detection band width equivalent to a response speed of the automatic level controller, to detect an average level detection signal, representing an average level of a main signal obtained before the electrical signal type is converted into the optical signal type, from the main signal, the automatic level controller performs the average level constant control with reference to the average level detection signal detected by the average level detector.

3. An optical communication system according to claim 1, wherein the automatic level controller adjusts the amplitude of the average level detection signal depending on an output level of the main signal output from the automatic level controller.

4. An optical communication system according to claim 1, wherein the optical transmission device further comprises a delay unit to fixedly delay time from when the electric-signal-type main signal is converted into an optical-signal-type main signal to when the main signal is transmitted toward the repeater.

5. An optical communication system according to claim 4, wherein the delay unit is a distribution compensation fiber.

6. An optical communication system according to claim 2, wherein the optical transmission device further comprises a delay unit to fixedly delay time from when the electric-signal-type main signal is received by the optical transmission device to when the main signal is converted into an optical-signal-type main signal.

7. An optical communication system according to claim 1, wherein the average level detector detects an electric-signal-type average level detection signal, and the optical transmission device converts the electric-signal-type average level detection signal into an optical-signal-type signal to transmit the optical-signal-type signal toward the repeater.

8. An optical communication system according to claim 7, wherein the optical transmission device multiplexes the optical-signal-type main signal and the optical-signal-type average level detection signal to transmit a multiplexed signal toward the repeater.

9. An optical communication system according to claim 7, wherein the average level detector detects an analog electric-signal-type average level detection signal, the optical transmission device converts the analog-signal-type average level detection signal into a digital electric-signal-type average level detection signal and converts the signal into an optical-signal-type signal to transmit the signal toward the repeater, the repeater converts the optical-signal-type average level detection signal received from the optical transmission device into a digital electric-signal-type signal, and the automatic level controller converts the digital-signal-type average level detection signal into an analog electric-signal-type signal.

10. An optical communication system according to claim 1, wherein the optical transmission device transmits a frame pulse synchronized with the main signal toward the repeater, and the automatic level controller adjusts phases of the main signal and the average level detection signal on the basis of the frame pulse transmitted from the optical transmission device.

11. An optical communication system comprising:

an optical transmission device to convert a plurality of electric-signal-type main signals into optical-signal-type main signals to transmit the main signals; and a repeater to receive the plurality of main signals transmitted from the optical transmission device to transmit the main signals toward the reception device for the main signals, wherein the optical transmission device comprises:
  a plurality of electric/optical converters to convert the plurality of electric-signal-type main signals into the optical-signal-type main signals;
  a multiplexer to generate a multiplexed main signal obtained by multiplexing the plurality of main signals converted into the optical-signal-type main signals by the plurality of electric/optical converters;
  a first automatic level controller to perform average level constant control on the multiplexed main signal to transmit the resultant main signal toward the repeater; and
  an average level detector to detect an average level signal representing an average level of the multiplexed main signal from the multiplexed main signal, the repeater comprises a second automatic level controller to perform average level constant control on the multiplexed main signal received from the optical transmission device to output the multiplexed main signal toward the reception device, the average level detector has a detection band width equivalent to response speeds of the first automatic level controller and the second automatic level controller, and the first automatic level controller and the second automatic level controller perform the average level constant control with reference to the average level detection signal.

12. An optical communication system comprising:

an optical transmission device to convert a plurality of electric-signal-type main signals into optical-signal-type main signals to transmit the main signals; and a repeater to receive the plurality of main signals transmitted from the optical transmission device to transmit the main signals toward a reception device for the main signals, wherein the optical transmission device comprises:
  a plurality of electric/optical converters to convert the plurality of electric-signal-type main signals into optical-signal-type main signals;
  a multiplexer to generate a multiplexed main signal obtained by multiplexing the main signals converted into the optical-signal-type main signals by the plurality of electric/optical converters;
  a first automatic level controller to perform average level constant control to the multiplexed main signal to transmit the resultant main signal toward the repeater; and
  an average level detector to detect average level signals of the electric-signal-type main signals from the main signal to add the average level signals to each other, the repeater has a second automatic level controller to perform average level constant control on the multiplexed main signal received from the optical transmission device to output the multiplexed main signal toward the reception device, the average level detector has a detection band width equivalent to response speeds of the first automatic level controller and the second automatic level controller, and the first automatic level controller and the second automatic level controller perform the average level constant control with reference to an addition result obtain by the average level detector.

13. An optical communication system according to claim 12, wherein the average level detector corrects an amplitude of the average level signal detected from each of the electric-signal-type main signals and adds the corrected average level signal.

14. An optical signal control method used with an optical communication system comprising an optical transmission device to convert an electric-signal-type main signal into an optical-signal-type signal, and a repeater to receive a main signal from the optical transmission device to transfer the main signal toward a reception device for a main signal, the method comprising:

performing average level constant control on the main signal received from the optical transmission device and then outputting the main signal toward the reception device, detecting an average level detection signal, representing an average level of a main signal obtained immediately after the electric signal type is converted into the optical signal type, from the main signal, and performing the average level constant control with reference to the average level detection signal detected, wherein a detection bandwidth of the average level detection signal is equivalent to a response speed of an average level constant control performed by the repeater.

15. An optical signal control method used with an optical communication system comprising an optical transmission device to convert an electric-signal-type main signal into an optical-signal-type signal, and a repeater to receive a main signal from the optical transmission device to transfer the main signal toward a reception device for a main signal, the method comprising:

performing average level constant control on the main signal received from the optical transmission device and then outputting the main signal toward the reception device, detecting an average level detection signal, representing an average level of a main signal obtained before the electric signal type is converted into the optical signal type, from the main signal, and performing the average level constant control with reference to the average level detection signal detected, wherein a detection bandwidth of the average level detection signal is equivalent to a response speed of an average level constant control performed by the repeater.

16. An optical signal control method according to claim 14, wherein the performing average level constant control adjusts an amplitude of the average level detection signal depending on an output level of the main signal outputted.

17. An optical signal control method according to claim 14, wherein the optical transmission device fixedly delays time from when the electric-signal-type main signal is converted into an optical-signal-type main signal to when the signal is transmitted toward the repeater.

18. An optical signal control method to claim 15, wherein the optical transmission device fixedly delays time from when the electric-signal-type main signal is received by the optical transmission device to when the main signal is converted into an optical-signal-type signal.

19. An optical signal control method to claim 14, wherein the average level detector detects an electric-signal-type average level detection signal, and the optical transmission device converts the electric-signal-type average level detection signal, converts the electric-signal-type average level detection signal into an optical-signal-type average level detection signal, and transmits the optical-signal-type average level detection signal toward the repeater.

20. An optical signal control method according to claim 19, wherein the optical transmission device multiplexes the optical-signal-type main signal and the optical-signal-type average level detection signal to transmit the multiplex signal toward the repeater.

21. An optical signal control method according to claim 19, wherein the detecting an average level detection signal detects an analog electric-signal-type average level detection signal, the optical transmission device converts the analog electric-signal-type average level detection signal into a digital electric-signal-type average level detection signal, converts the digital electric-signal-type main signal into an optical-signal-type main signal, and transmits the optical-signal-type main signal toward the repeater, the repeater converts the optical-signal-type average level detection signal received from the optical transmission device into a digital electric-signal-type average level detection signal, and the performing average level constant control converts the average level detection signal into an analog electric-signal-type signal.

22. An optical signal control method according to claim 14, wherein the optical transmission device transmits a frame pulse synchronized with the main signal toward the repeater, and the performing average level constant control adjusts phases of the main signal and the average level detection signal on the basis of the frame pulse transmitted from the optical transmission device.

23. An optical signal control method used with an optical communication system comprising an optical transmission device for multiplexing a plurality of optical signals to perform average level constant control, and a repeater to receive an optical signal transmitted from the optical transmission device to perform average level constant control to transfer the optical signal toward a reception device for the optical signal, wherein the optical transmission device detects an average level detection signal, representing an average level of a multiplexed optical signal, from the multiplexed optical signal in a detection band width equivalent to a response speed of average level constant control performed by the optical transmission device and a response speed of average level constant control performed by the repeater, and performs the average level constant control with reference to the average level detection signal, and the repeater receives an average level detection signal from the optical transmission device and performs the average level constant control with reference to the average level detection signal.

24. An optical signal control method used with an optical communication system comprising an optical transmission device to convert a plurality of electric signals into optical signals and multiplex the optical signal, perform average level constant control, and transmit a resultant signal, and a repeater to receive an optical signal transmitted from the optical transmission device, perform average level constant control, and transfer a resultant signal toward a reception device for the signal, wherein the optical transmission device detects average level signals of electric signals before the electric signals are converted into optical signals in a detection band width equivalent to a response speed of average level constant control performed by the optical transmission device and a response speed of average level constant control performed by the repeater, adds the average level signals to each other, and performs the average level constant control with reference to the addition result, and the repeater receives the addition result of the plurality of average level signals from the optical transmission device and performs the average level constant control with reference to the addition result.

* * * * *